United States Patent
Toriyama et al.

(10) Patent No.: US 11,624,970 B2
(45) Date of Patent: Apr. 11, 2023

(54) PROJECTION LIQUID CRYSTAL DISPLAY DEVICE AND ELECTRONIC APPARATUS

(71) Applicant: SONY CORPORATION, Tokyo (JP)

(72) Inventors: Akiko Toriyama, Tokyo (JP); Yoshitaka Yagi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,751

(22) PCT Filed: Aug. 7, 2019

(86) PCT No.: PCT/JP2019/031031
§ 371 (c)(1),
(2) Date: Mar. 1, 2021

(87) PCT Pub. No.: WO2020/054270
PCT Pub. Date: Mar. 19, 2020

(65) Prior Publication Data
US 2022/0113611 A1    Apr. 14, 2022

(30) Foreign Application Priority Data

Sep. 10, 2018    (JP) .............................. JP2018-168620

(51) Int. Cl.
G03B 21/00    (2006.01)
(52) U.S. Cl.
CPC ................................. *G03B 21/006* (2013.01)
(58) Field of Classification Search
None
See application file for complete search history.

(56) References Cited

U.S. PATENT DOCUMENTS

| 2009/0021699 | A1 | 1/2009 | Hsu et al. |
| 2012/0182486 | A1* | 7/2012 | Haruyama ............. H04N 9/317 349/5 |
| 2019/0369476 | A1* | 12/2019 | Wu .......................... G02B 5/20 |

FOREIGN PATENT DOCUMENTS

| CN | 101349818 A | 1/2009 |
| JP | 63-104019 A | 5/1988 |
| JP | 2-222926 A | 9/1990 |

(Continued)

OTHER PUBLICATIONS

International Search Report and Written Opinion of PCT Application No. PCT/JP2019/031031, dated Oct. 8, 2019, 10 pages of ISRWO.

*Primary Examiner* — Phu Vu
(74) *Attorney, Agent, or Firm* — Chip Law Group

(57) ABSTRACT

A projection liquid crystal display device including a first optical system that splits a light beam outputted from a light source into a red light beam, a green light beam, and a blue light beam, a red liquid crystal panel, a green liquid crystal panel, and a blue liquid crystal panel that modulate the red light beam, the green light beam, and the blue light beam, respectively, a second optical system that combines the modulated red light beam, the modulated green light beam, and the modulated blue light beam into one optical path, and a projection lens system that projects a light beam outputted from the second optical system on a projection surface, in which a configuration of a liquid crystal layer of the red liquid crystal panel is different from respective configurations of liquid crystal layers of the green liquid crystal panel and the blue liquid crystal panel.

10 Claims, 9 Drawing Sheets

(56) References Cited

FOREIGN PATENT DOCUMENTS

| JP | 03-6524 A | | 1/1991 |
|---|---|---|---|
| JP | 04-106540 A | | 4/1992 |
| JP | H07152026 A | * | 6/1995 |
| JP | 2742788 B2 | * | 4/1998 |
| JP | 11-223808 A | | 8/1999 |
| JP | 2008-170764 A | | 7/2008 |

* cited by examiner

PROJECTION LIQUID CRYSTAL DISPLAY DEVICE AND ELECTRONIC APPARATUS

CROSS REFERENCE TO RELATED APPLICATIONS

This application is a U.S. National Phase of International Patent Application No. PCT/JP2019/031031 filed on Aug. 7, 2019, which claims priority benefit of Japanese Patent Application No. JP 2018-168620 filed in the Japan Patent Office on Sep. 10, 2018. Each of the above-referenced applications is hereby incorporated herein by reference in its entirety.

TECHNICAL FIELD

The present disclosure relates to a projection liquid crystal display device and an electronic apparatus.

BACKGROUND ART

A projection liquid crystal display device has recently been widely used which generates an image by optically modulating a light beam outputted from a light source by liquid crystal panels, and projects the generated image on a projection surface such as a screen. Such a projection liquid crystal display device splits the light beam outputted from the light source into a red light beam, a green light beam, and a blue light beam, modulates the split light beams of the respective colors by the liquid crystal panels, and combines the modulated light beams of the respective colors to generate the image.

Used as the liquid crystal panels that modulate the respective color light beams included in the projection liquid crystal display device are, for example, each a vertical alignment liquid crystal panel in which liquid crystal molecules are vertically oriented with respect to a substrate in a state where no voltage is applied. In the vertical alignment liquid crystal panel, the liquid crystal molecules are tilted in a direction parallel to the substrate upon application of a voltage to control polarization of a light beam passing through the liquid crystal panel and to control dark display or bright display of the liquid crystal panel.

Here, in the vertical alignment liquid crystal panel, a relationship between an applied voltage and a light transmittance is known to vary depending on a wavelength of an entering light beam. Accordingly, in order to display an appropriate color image on the projection liquid crystal display device, each of the relationships between the applied voltages and the light transmittances in the liquid crystal panels that modulate the respective color light beams is to be individually adjusted.

For example, PTL 1 below discloses a projection liquid crystal display device in which each of levels of driving voltages of the liquid crystal panels that modulate the respective color light beams is individually adjusted to obtain an appropriate color image.

CITATION LIST

Patent Literature

PTL 1: Japanese Unexamined Patent Application Publication No. H11-223808

SUMMARY OF THE INVENTION

Problems to be Solved by the Invention

However, according to the technique disclosed in PTL 1, it has been necessary to adjust each of the levels of driving voltages of the liquid crystal panels after each of the relationships between driving voltages and light transparencies of the liquid crystal panels has grasped; thus, the adjustment of the projection liquid crystal display device has been complicated.

Accordingly, a projection liquid crystal display device has been desired in which liquid crystal panels that modulate respective color light beams are easily adjusted.

Means for Solving the Problems

According to the present disclosure, there is provided a projection liquid crystal display device including: a first optical system that splits a light beam outputted from a light source into a red light beam, a green light beam, and a blue light beam; a red liquid crystal panel that modulates the red light beam; a green liquid crystal panel that modulates the green light beam; a blue liquid crystal panel that modulates the blue light beam; a second optical system that combines the modulated red light beam, the modulated green light beam, and the modulated blue light beam into one optical path; and a projection lens system that projects a light beam outputted from the second optical system on a projection surface, in which a driving voltage of the red liquid crystal panel, a driving voltage of the green liquid crystal panel, and a driving voltage of the blue liquid crystal panel are identical to each other, and a configuration of a liquid crystal layer of the red liquid crystal panel is different from a configuration of a liquid crystal layer of the green liquid crystal panel and a configuration of a liquid crystal layer of the blue liquid crystal panel.

Further, according to the present disclosure, there is provided an electronic apparatus including: a first optical system that splits a light beam outputted from a light source into a red light beam, a green light beam, and a blue light beam; a red liquid crystal panel that modulates the red light beam; a green liquid crystal panel that modulates the green light beam; a blue liquid crystal panel that modulates the blue light beam; a second optical system that combines the modulated red light beam, the modulated green light beam, and the modulated blue light beam into one optical path; and a projection lens system that projects a light beam outputted from the second optical system on a projection surface, in which a driving voltage of the red liquid crystal panel, a driving voltage of the green liquid crystal panel, and a driving voltage of the blue liquid crystal panel are identical to each other, and a configuration of a liquid crystal layer of the red liquid crystal panel is different from a configuration of a liquid crystal layer of the green liquid crystal panel and a configuration of a liquid crystal layer of the blue liquid crystal panel.

According to the present disclosure, it is possible to bring an applied voltage-light transmittance characteristic of the red liquid crystal panel closer to applied voltage-light transmittance characteristics of the green liquid crystal panel and the blue liquid crystal panel.

Effects of the Invention

As described above, according to the present disclosure, it is possible to more easily adjust each of the liquid crystal panels that modulate the respective color light beams in the projection liquid crystal display device.

It is to be noted that the effects described above are not necessarily limitative. With or in the place of the above effects, there may be achieved any one of the effects described in this specification or other effects that may be grasped from this specification.

MODES FOR CARRYING OUT THE INVENTION

The following describes a preferred embodiment of the present disclosure in detail with reference to the accompanying drawings. It is to be noted that, in this description and the accompanying drawings, components that have substantially the same functional configuration are indicated by the same reference signs, and thus redundant description thereof is omitted.

It is to be noted that description is given in the following order.
1. Item to Which Technology According to the Present Disclosure is Applied
   1.1. Projection Liquid Crystal Display Device
   1.2. Light Source
   1.3. Light Modulator
2. Contents of Technology According to the Present Disclosure
   2.1. Background of Technology According to the Present Disclosure
   2.2. First Specific Example
   2.3. Second Specific Example
3. Examples

1. Item to Which Technology According to the Present Disclosure is Applied

1.1. Projection Liquid Crystal Display Device

Figure 1:
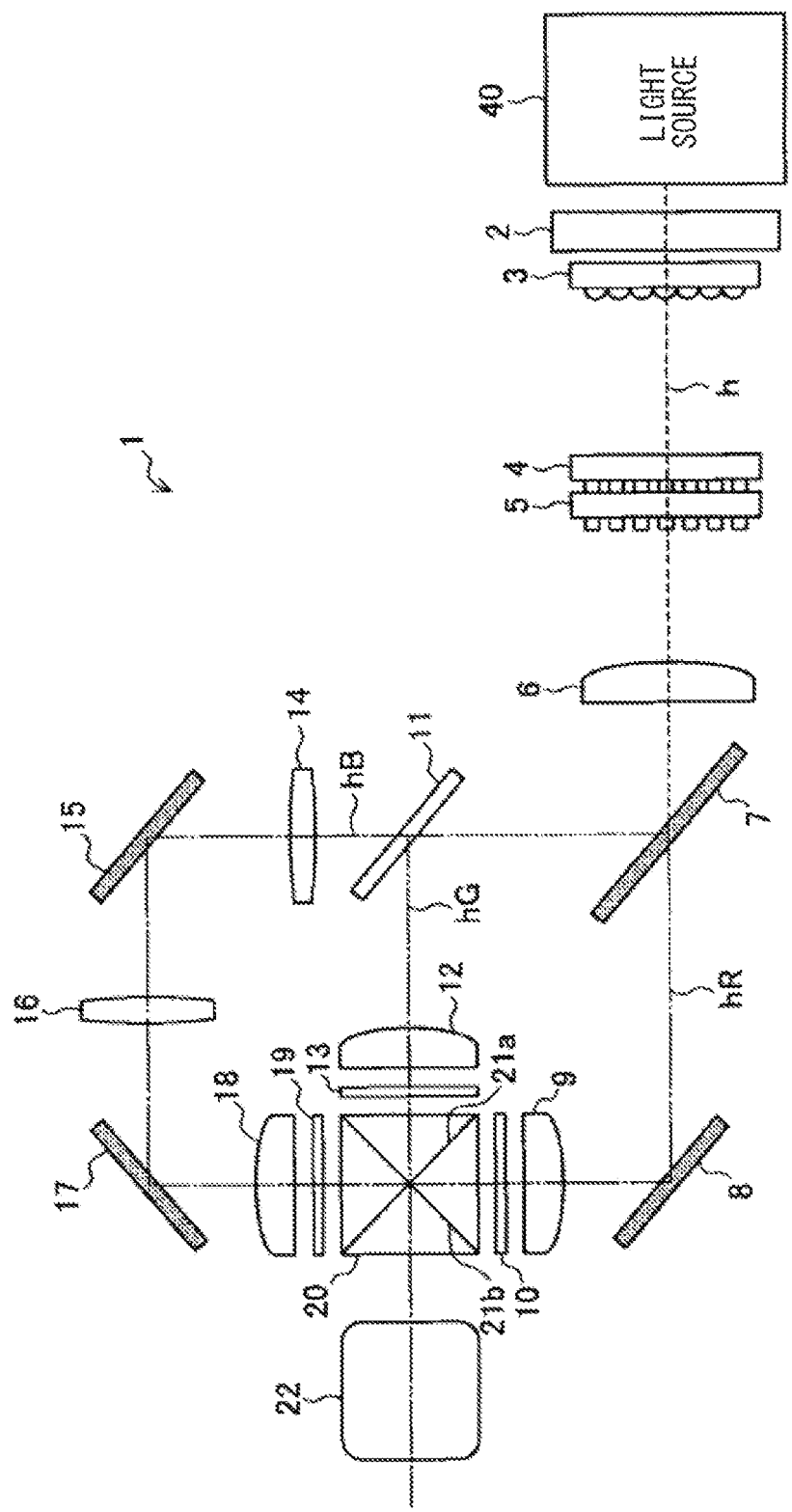
FIG. 1 is an explanatory diagram that schematically describes an example of an overall configuration of a projection liquid crystal display device.

First, referring to FIG. 1, a projection liquid crystal display device to which a technology according to the present disclosure is applied will be described. FIG. 1 is an explanatory diagram that schematically describes an example of an overall configuration of the projection liquid crystal display device.

As illustrated in FIG. 1, a projection liquid crystal display device 1 is a so-called liquid crystal projector. Specifically, the projection liquid crystal display device 1 is a display device that generates a color image by splitting a light beam h from a light source 40 into three colors of a red light beam hR, a green light beam hG, and a blue light beam hB, and modulating the red light beam hR, the green light beam hG, and the blue light beam hB that have been split by light modulators 10, 13, and 19, respectively. Such a projection liquid crystal display device 1 is also referred to as three-plate liquid crystal projector, for example.

In the projection liquid crystal display device 1, first, the light beam h outputted from the light source 40 sequentially passes through a cut filter 2, a first fly-eye lens 3, a second fly-eye lens 4, a polarization conversion element 5, and a plano-convex lens 6, and then enters a dichroic mirror 7.

The light source 40 outputs a white light beam h including, for example, a red light beam, a green light beam, and a blue light beam, which are three primary colors of light. Using such a light source 40 makes it possible for the projection liquid crystal display device 1 to generate a full-color image. The light source 40 may be, for example, an ultra-high pressure mercury lamp, or may be an LED (Light Emitting Diode) laser light source or a semiconductor laser light source.

The cut filter 2 is a flat mirror that removes light in the ultraviolet region included in the white light beam h outputted from the light source 40. The cut filter 2 may have, on a glass substrate, a coating that reflects light in the ultraviolet region, for example.

The first fly-eye lens 3 and the second fly-eye lens 4 uniform an illuminance distribution of the white light beam h emitted from the light source 40, and change a shape of the white light beam h to a shape corresponding to an effective area of the light modulators 10, 13, and 19 in the subsequent stage. As a result, the red light beam hR, the green light beam hG, and the blue light beam hB obtained by splitting the white light beam h are uniformly applied within the effective area of the light modulators 10, 13, and 19.

For example, the first fly-eye lens 3 has a structure in which a plurality of microlenses are arranged in an array-like manner. The first fly-eye lens 3 forms a point light source group by condensing the white light beam h by the microlenses. The light beams from the point light source group are combined by the second fly-eye lens 4 to form a light flux having a shape corresponding to the effective area of the light modulators 10, 13, and 19. It is to be noted that the external shapes of the first fly-eye lens 3 and the second fly-eye lens 4 may be similar shapes each having an aspect ratio substantially equal to the effective area of the light modulators 10, 13, and 19 (i.e., corresponding to an irradiated area of the light modulators 10, 13, and 19).

The polarization conversion element 5 converts the light beam condensed by the first fly-eye lens 3 and the second fly-eye lens 4 into a light beam of a predetermined polarization direction. The polarization conversion element 5 converts an unpolarized light beam (e.g., P-polarized wave and S-polarized wave) outputted from the light source 40 into a light beam (e.g., P-polarized wave) of a predetermined polarization direction corresponding to light modulators 10, 13, and 19. The polarization conversion element 5 may be a known polarizer such as, for example, a birefringent crystal, a film-polarizer, or a reflective polarizer.

The light beam outputted from the polarization conversion element 5 is condensed by the plano-convex lens 6, and the light beam h outputted from the plano-convex lens 6 is split into the red light beam hR, and the green light beam hG and the blue light beam hB by the dichroic mirror 7. The red light beam hR enters the light modulator 10 via a mirror 8 and a plano-convex lens 9. Further, the green light beam hG is split from the blue light beam hB by a dichroic mirror 11, and enters the light modulator 13 via a plano-convex lens 12. Moreover, the blue light beam hB enters the light modulator 19 via a lens 14, a mirror 15, a lens 16, a mirror 17, and a plano-convex lens 18.

The dichroic mirrors 7 and 11 are each a wavelength-selective mirror obtained by stacking a plurality of dielectric films on one main surface such as a glass substrate. Specifically, the dichroic mirror 7 transmits the red light beam hR, and reflects the green light beam hG and the blue light beam hB, thereby splitting the light beam into: the red light beam hR; and the green light beam hG and the blue light beam hB. The dichroic mirror 11 transmits the blue light beam hB and reflects the green light beam hG, thereby splitting the light beam into: the green light beam hG; and the blue light beam hB.

The light modulators 10, 13, and 19 each include a liquid crystal panel and function as a light valve of the projection liquid crystal display device 1. The light modulators 10, 13, and 19 will be described in detail later.

The red light beam hR, the green light beam hG, and the blue light beam hB modulated by the light modulators 10, 13, and 19 are combined by a cross prism 20. The cross prism 20 has, for example, an outer shape obtained by bonding a plurality of glass prisms, and is provided with interference filters 21a and 21b each having a predetermined optical characteristic on a bonding surface of the glass prisms. The interference filter 21a is provided to reflect the red light beam hR and transmit the green light beam hG, and the interference filter 21b is provided to reflect the blue light beam hB and transmit the green light beam hG. Thus, the red light beam hR is reflected to a projection lens 22 side by the interference filter 21a, and the blue light beam hB is to be reflected to the projection lens 22 side by the interference filter 21b. Further, the green light beam hG reaches the projection lens 22 side by passing through the interference filters 21a and 21b. Thus, the cross prism 20 is able to combine the red light beam hR, the green light beam hG, and the blue light beam hB into one optical axis. The light beam combined by the cross prism 20 is projected onto a projection surface such as a screen by the projection lens 22.

1.2. Light Source

Figure 2A:
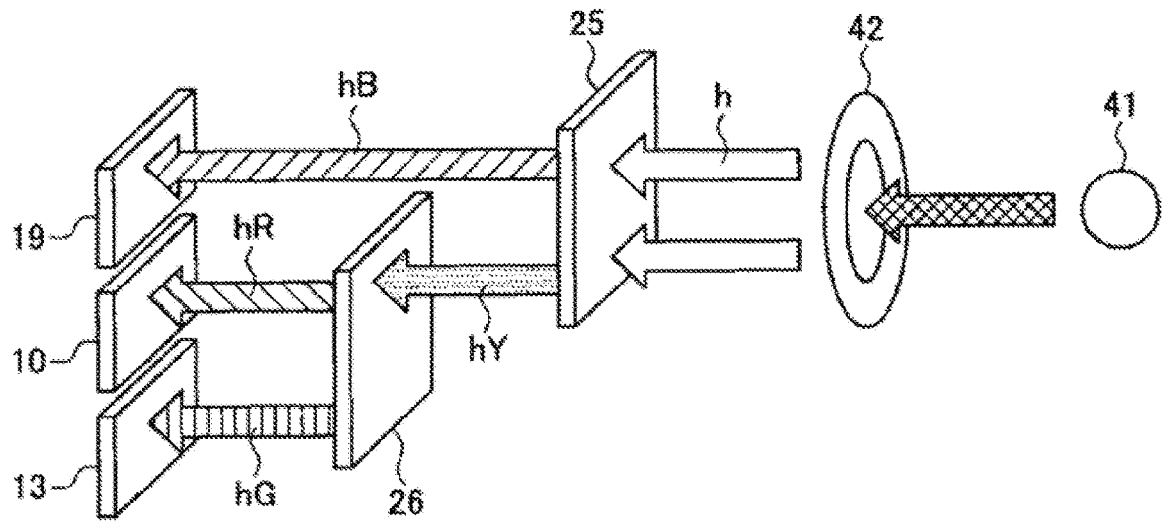
FIG. 2A is an explanatory diagram illustrating an example of a light source and an optical system used in the projection liquid crystal display device.

Subsequently, referring to FIG. 2A and FIG. 2B, light sources used in the projection liquid crystal display device 1 will be described. FIG. 2A is an explanatory diagram illustrating an example of a light source and an optical system used in the projection liquid crystal display device 1, and FIG. 2B is an explanatory diagram illustrating another example of light sources and an optical system used in the projection liquid crystal display device 1.

As illustrated in FIG. 2A, a light source used in the projection liquid crystal display device 1 may be a blue laser light source 41. Also in a case where such a light source is used, the projection liquid crystal display device 1 is able to generate the red light beam hR, the green light beam hG, and the blue light beam hB.

Specifically, the blue light beam outputted from the blue laser light source 41 is subjected to wavelength conversion into a white light beam h by a fluorescent wheel 42. The white light beam h is split into the blue light beam hB and a yellow light beam hY, for example, by a dichroic mirror 25, and the blue light beam hB enters the light modulator 19. The yellow light beam hY is further split into the red light beam hR and the green light beam hG by, for example, a dichroic mirror 26. The red light beam hR enters the light modulator 10 and the green light beam hG enters the light modulator 13. Thus, also in the case where the blue laser light source 41 is used as a light source, the projection liquid crystal display device 1 is able to generate the red light beam hR, the green light beam hG, and the blue light beam hB modulated by the light modulators 10, 13, and 19.

Figure 2B:
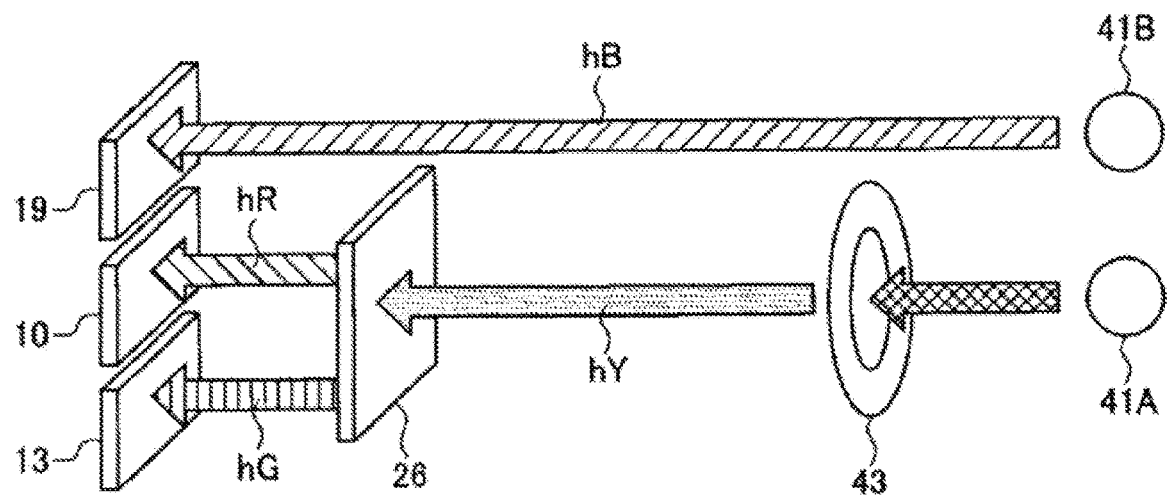
FIG. 2B is an explanatory diagram illustrating another example of light sources and an optical system used in the projection liquid crystal display device.

Further, as illustrated in FIG. 2B, light sources used in the projection liquid crystal display device 1 may be a plurality of blue laser light sources 41A and 41B. Also in a case where such light sources are used, the projection liquid crystal display device 1 is able to generate the red light beam hR, the green light beam hG, and the blue light beam hB.

Specifically, the blue light beam hB outputted from the blue laser light source 41A enters the light modulator 19. Further, the blue light beam outputted from the blue laser light source 41B is subjected to wavelength conversion into the yellow light beam hY by the fluorescent wheel 43, and the yellow light beam hY having been subjected to the wavelength conversion is split into the red light beam hR and the green light beam hG by, for example, the dichroic mirror 26. The red light beam hR enters the light modulator 10 and the green light beam hG enters the light modulator 13. Thus, also in the case where the plurality of blue laser light sources 41A and 41B are used as light sources, the projection liquid crystal display device 1 is able to generate the red light beam hR, the green light beam hG, and the blue light beam hB modulated by the light modulators 10, 13, and 19.

That is, the light source to be used in the projection liquid crystal display device 1 is not limited to an ultra-high pressure mercury lamp, an LED laser light source, or a semiconductor laser light source that is able to output the white light beam h. The projection liquid crystal display device 1 is also able to use a light source that outputs a light beam of a predetermined wavelength such as the blue light beam.

1.3. Light Modulator

Figure 3:
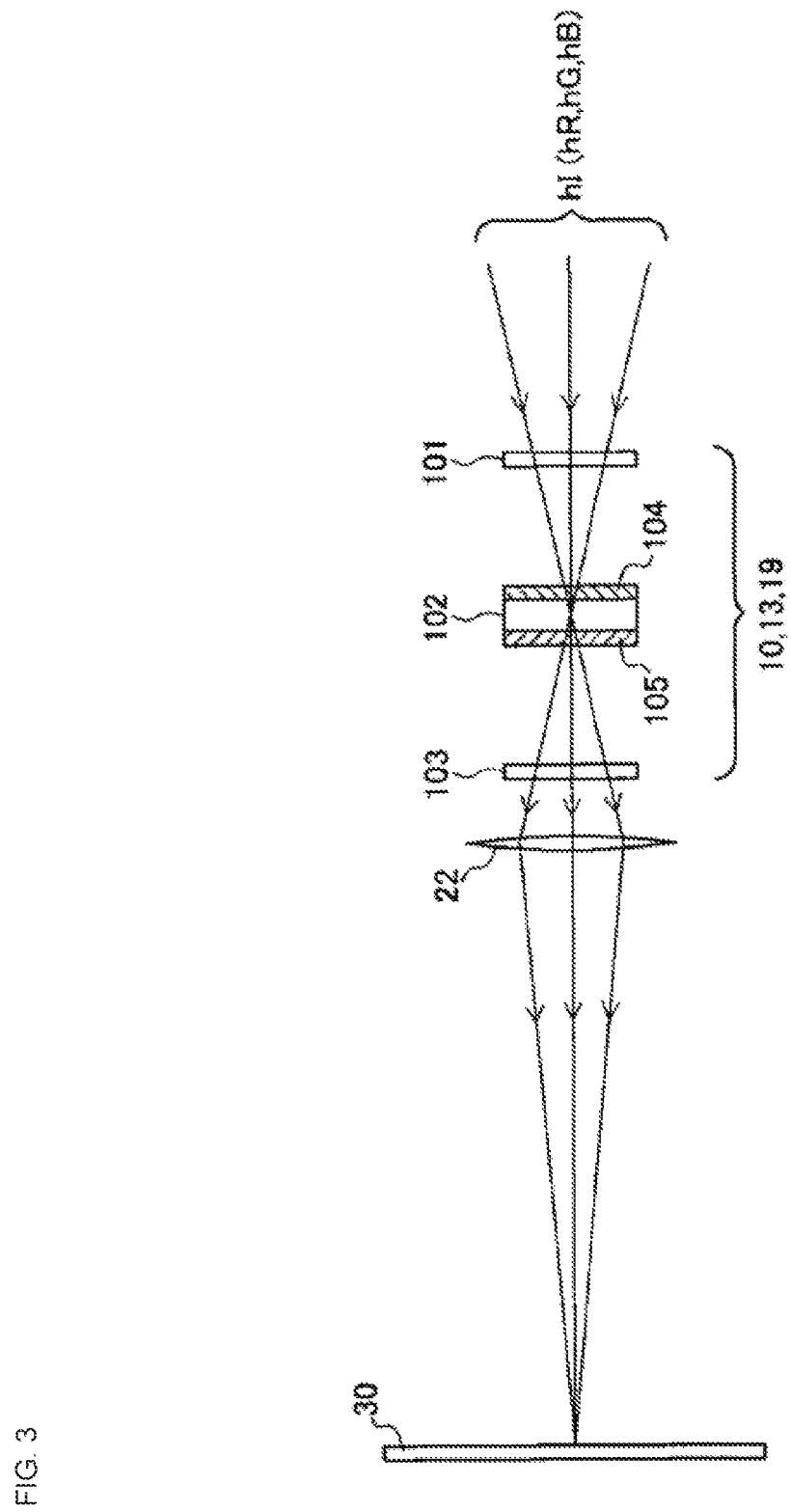
FIG. 3 is a schematic explanatory diagram that describes a configuration of a light modulator.

Next, referring to FIGS. 3 to 6, specific configurations of the light modulators 10, 13, and 19 provided in the projection liquid crystal display device 1 will be described. FIG. 3 is a schematic explanatory diagram that describes a configuration of the light modulators 10, 13, and 19.

As illustrated in FIG. 3, the light modulators 10, 13, and 19 each have a configuration in which an entrance-side polarizing plate 101, a liquid crystal cell 102, and an output-side polarizing plate 103 are sequentially disposed on an optical path of a projection light beam hI. The light modulators 10, 13, and 19 may each be, for example, a liquid crystal panel.

The light modulators 10, 13, and 19 are disposed inside the projection liquid crystal display device 1 such that the projection light beam hI that enters from the entrance-side polarizing plate 101 and is outputted from the output-side polarizing plate 103 enters the cross prism 20 (not illustrated in FIG. 3) and the projection lens 22. The projection light beam hI modulated by the light modulators 10, 13, and 19 is combined by the cross prism 20 and then projected on the projection surface 30 via the projection lens 22.

The entrance-side polarizing plate 101 and the output-side polarizing plate 103 are each an optical element that transmits only a polarized light beam in a specific direction. The entrance-side polarizing plate 101 and the output-side polarizing plate 103 are disposed such that the respective directions of the polarized light beams to be transmitted through are perpendicular to each other (i.e., in a cross-nicol). As a result, the light modulators 10, 13, and 19 are able to control the transmittance of the projection light beam hI in the output-side polarizing plate 103 by controlling the polarization of the projection light beam hI by the liquid crystal cell 102. The entrance-side polarizing plate 101 and the output-side polarizing plate 103 may each be, for example, a film polarizer including polyvinyl alcohol or the like.

The liquid crystal cell 102 is sandwiched between the entrance-side polarizing plate 101 and the output-side polarizing plate 103 and controls a polarization direction of the projection light beam hI. Both surfaces of the liquid crystal cell 102 may be protected by dustproof glass 104 and 105. As described below, the liquid crystal cell 102 may be driven in a so-called vertical alignment (VA) type.

Figure 4:
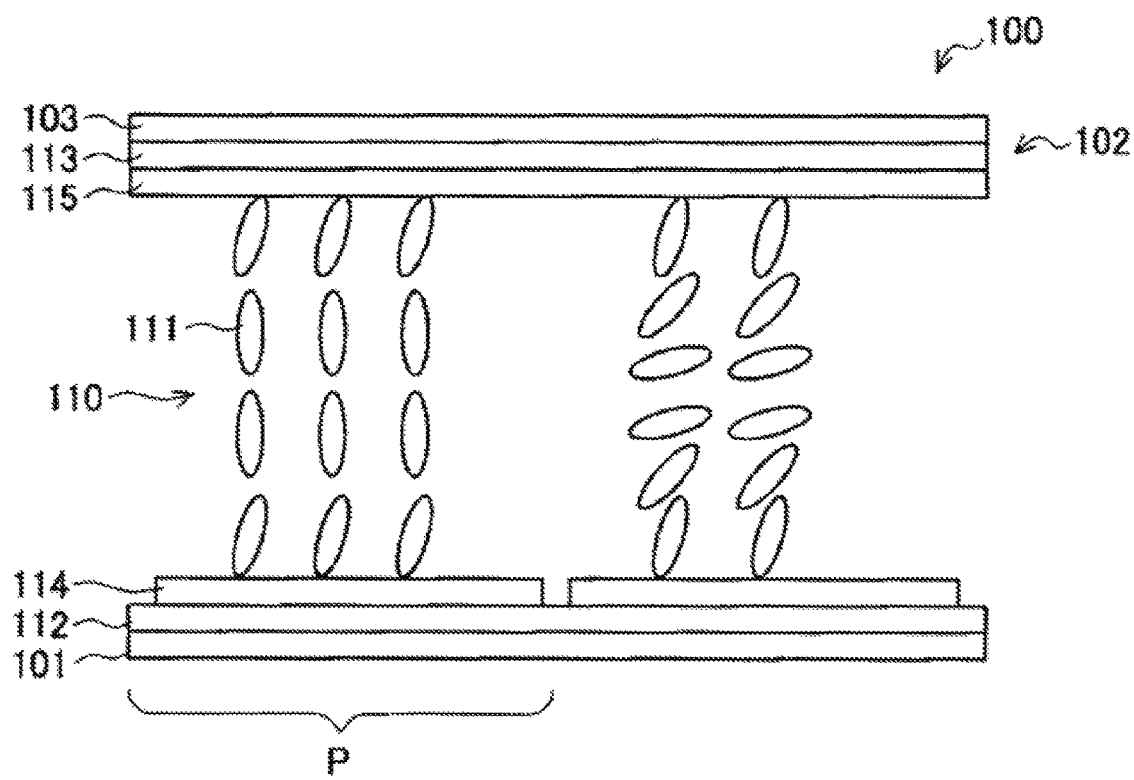
FIG. 4 is a schematic cross-sectional view of a configuration of a liquid crystal panel.
Figure 5:
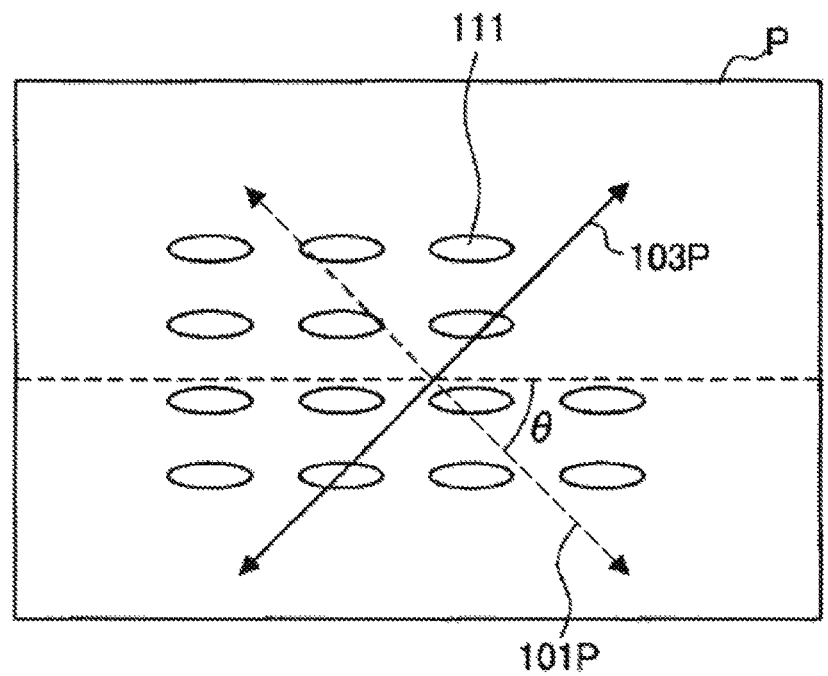
FIG. 5 is a schematic plan view of the configuration of the liquid crystal panel.

Referring now to FIGS. 4 and 5, a liquid crystal panel 100 as a more specific configuration of the light modulators 10, 13, and 19 will be described. FIG. 4 is a schematic cross-sectional view of a configuration of a liquid crystal panel, and FIG. 5 is a schematic plan view of the configuration of the liquid crystal panel.

As illustrated in FIG. 4, the liquid crystal panel 100 includes the entrance-side polarizing plate 101, a circuit board 112, a pixel electrode 114, a liquid crystal layer 110 including a liquid crystal material 111, a counter substrate 113, and the output-side polarizing plate 103.

Since the entrance-side polarizing plate 101 and the output-side polarizing plate 103 have substantially similar configurations as those described above, their descriptions are omitted here.

The circuit board 112 is a board on which a circuit such as a transistor that controls driving of each of pixels provided on a pixel region of the liquid crystal cell 102 is provided. The circuit board 112 may be, for example, a quartz substrate, a glass substrate, or the like that is able to transmit light. In such a case, the circuit such as a transistor may be formed in a semiconductor layer provided in a peripheral region of a pixel region P of the circuit board 112.

The pixel electrode 114 is provided, separately for each pixel region P, on a surface of the circuit board 112 on a side of the liquid crystal layer 110. The pixel electrode 114 controls an orientation of the liquid crystal material 111 by generating an electric field with a counter electrode 115 by application of a pixel signal. The pixel electrode 114 may be, for example, a transparent conductive thin film such as an indium-tin-oxide (ITO) film.

The counter substrate 113 is opposed the circuit board 112. The counter substrate 113 may be, for example, a quartz substrate, a glass substrate, or the like that is able to transmit light.

The counter electrode 115 is provided over an entire surface of the counter substrate 113 on a side of the liquid crystal layer 110. The counter electrode 115 controls the orientation of the liquid crystal material 111 by generating an electric field with the pixel electrode 114 to which the pixel signal is applied. The counter electrode 115 may be, for example, a transparent conductive thin film such as an indium-tin-oxide (ITO) film.

The liquid crystal layer 110 is a layer in which the liquid crystal material 111 is arranged in a predetermined orientation. The liquid crystal material 111 is a material in which the orientation or order of a molecular assembly changes depending on a magnitude of an applied electric field, and the liquid crystal layer 110 modulates the polarization direction of the projection light beam by controlling the orientation or order of the molecular assembly of the liquid crystal material 111. The polarization direction of the projection light beam is modulated by the liquid crystal layer 110 to thereby modulate the transmittance of the projection light beam at the output-side polarizing plate 103, which makes it possible for the liquid crystal cell 102 to generate the projection light beam gradated in accordance with the pixel signal. Specifically, the liquid crystal material 111 may be a known thermosetting or photocurable liquid crystal polymer material. For example, the liquid crystal material 111 may be a negative nematic liquid crystal material or the like.

Here, in the liquid crystal layer 110, the liquid crystal material 111 is oriented in the vertical alignment (VA) type. In the liquid crystal layer 110 of the vertical alignment type, by using the liquid crystal material 111 having a negative dielectric constant anisotropy, the liquid crystal material 111 is controlled so as to orient in a perpendicular direction with respect to the circuit board 112 and the counter substrate 113 when no voltage is applied. In addition, the liquid crystal material 111 is controlled so as to tilt in a parallel direction with respect to the circuit board 112 and the counter substrate 113 when a voltage is applied. Thus, the liquid crystal material 111 is able to control the polarization direction of the projection light beam that has entered the liquid crystal layer 110 by a difference in a refractive index of a long axis and a short axis of the liquid crystal material 111.

For example, the left pixel facing FIG. 4 illustrates an orientation state of the liquid crystal material 111 when no voltage is applied. According to this, it is appreciated that the liquid crystal material 111 is oriented in the perpendicular direction with respect to the circuit board 112 and the counter substrate 113 when no voltage is applied. At this time, the liquid crystal panel 100 is in a dark display state.

On the other hand, the right pixel facing FIG. 4 illustrates an orientation state of the liquid crystal material 111 when a voltage is applied. According to this, it is appreciated that the liquid crystal material 111 is tilted in the parallel direction with respect to the circuit board 112 and the counter substrate 113 when the voltage is applied. At this time, the liquid crystal panel 100 is in a bright display state. It is to be noted that an orientation regulating force (also referred to as anchoring energy) of the liquid crystal material 111 in the vicinity of the circuit board 112 and the counter substrate 113 is high; and thus, the orientation also does not change much by the voltage application.

Further, FIG. 5 illustrates a tilting direction in the plane of the liquid crystal material 111 at the time of voltage application. As illustrated in FIG. 5, an optical axis direction 101P of the entrance-side polarizing plate 101 (a polarization direction that enables the transmission through the entrance-side polarizing plate 101) and an optical axis direction 103P of the output-side polarizing plate 103 (a polarization direction that enables the transmission through the output-side polarizing plate 103) are perpendicular to each other, and the liquid crystal material 111 is oriented in a direction tilted by an angle θ with respect to the optical axis direction 101P when an voltage is applied. Thus, the projection light beam is to be polarized when transmitted through the liquid crystal layer 110 at the time of voltage application.

Figure 6:
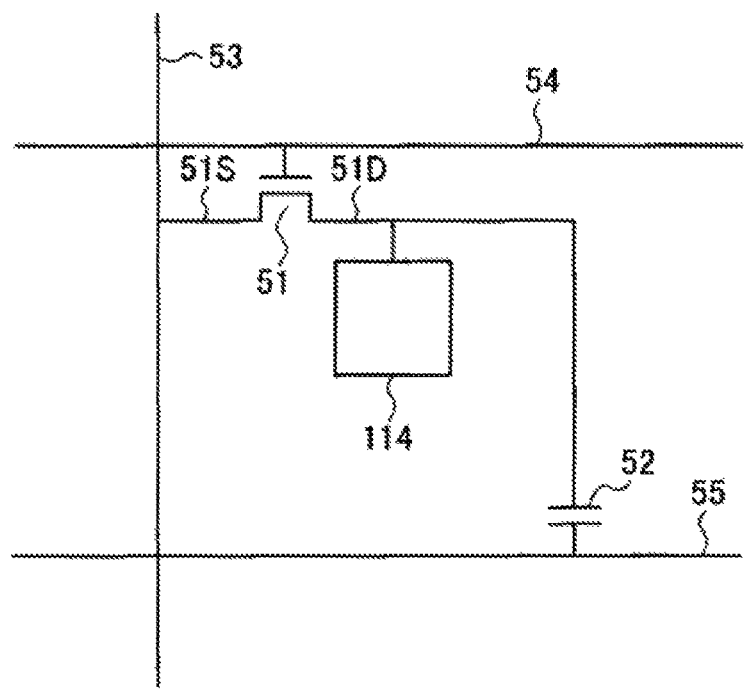
FIG. 6 is a circuit diagram illustrating a control circuit that controls driving of one pixel of the liquid crystal panel.

Further, referring to FIG. 6, a control circuit that controls one pixel of the liquid crystal panel 100 will be described. FIG. 6 is a circuit diagram illustrating a control circuit that controls driving of one pixel of the liquid crystal panel 100.

As illustrated in FIG. 6, the control circuit that controls the driving of one pixel of the liquid crystal panel 100 includes a pixel electrode 114, a switching transistor 51, a signal line 53, a scan line 54, a storage capacitor 52, and a common electrode line 55.

A plurality of pixel electrodes 114 is arranged in a matrix on the pixel region of the liquid crystal panel 100. By applying a voltage to the pixel electrode 114, the orientation of the liquid crystal material 111 included in the liquid crystal layer 110 is controlled.

The switching transistor 51 is a thin film transistor (TFT) that controls switching of the voltage application to the pixel electrode 114. Specifically, the pixel electrode 114 is electrically coupled to a drain 51D of the switching transistor, and the signal line 53 that supplies the pixel signal is electrically coupled to a source 51S of the switching transistor 51.

Further, the scan line 54 is electrically coupled to the gate of the switching transistor 51. A pulsed scan signal is applied to the scan line 54 at a predetermined timing, and turns on the switching transistor 51, and thereby applying the pixel signal supplied from the signal line 53 is applied to the pixel electrode 114. The pixel signal applied to the pixel electrode 114 is held between the pixel electrode 114 and the counter electrode 115 for a fixed time period. Thus, the orientation of the liquid crystal material 111 included in the liquid crystal layer 110 between the pixel electrode 114 and the counter electrode 115 is controlled.

The storage capacitor 52 is provided so as to be in parallel with a capacitance formed between the pixel electrode 114 and the counter electrode 115 in order to prevent the pixel signal applied to the pixel electrode 114 from being leaked. Specifically, the storage capacitor 52 is provided between a wiring line electrically coupled to the pixel electrode 114 and the common electrode line 55. By providing the storage capacitor 52, it is possible to further improve a holding characteristic of the pixel signal written in the pixel electrode 114, which makes it possible to further increase a contrast ratio of the liquid crystal panel 100.

The projection liquid crystal display device 1 to which a technology according to the present disclosure is applied has been specifically described above.

2. Contents of Technology According to the Present Disclosure 2.1. Background of Technology According to the Present Disclosure Next, referring to FIG. 7 and FIG. 8, a background of a technology according to the present disclosure will be described.

In the projection liquid crystal display device 1 described above, the light modulators 10, 13, and 19 (i.e., liquid crystal panels 100) that modulate the respective color light beams differ from each other only in the wavelengths of the light beams to be applied, and thus are provided with a substantially common configuration in order to improve productivity.

However, in the case where the liquid crystal panels 100 that modulate the respective color light beams have the substantially common configuration, adjustment of each of the liquid crystal panels 100 that modulate the respective color light beams becomes complicated due to the following circumstances described below.

First, as a first circumstance, in a case where the wavelengths of the light beams to be applied differ from each other, a variability characteristic of a light transmittance with respect to an applied voltage changes in the liquid crystal panel 100.

Specifically, the light transmittance of the liquid crystal panel 100 is a ratio at which the projection light beam whose polarization direction is modulated by the liquid crystal layer 110 passes through the output-side polarizing plate 103. That is, the light transmittance of the liquid crystal panel 100 indicates to what extent the polarization direction of the projection light beam is polarized by the liquid crystal layer 110 towards the optical axis direction 103P of the output-side polarizing plate 103.

Here, a degree of light transmittance of the liquid crystal panel 100 depends on an inclination θ of an orientation direction of the liquid crystal material 111 with respect to the optical axis direction 101P of the entrance-side polarizing plate 101 and a front phase difference of the liquid crystal layer 110 in the projection light beam, and may be expressed by the following Equation 1.

[Math 1]

$$I = I_0 \cdot \sin^2(2\theta) \cdot \sin^2\left(\frac{\pi \cdot \Delta nd}{\lambda}\right) \qquad \text{Equation 1}$$

In Equation 1: I0 represents an intensity of a light beam entering the liquid crystal panel 100; I represents an intensity of a light beam transmitting through the liquid crystal panel 100; θ represents an angle between the optical axis direction 101P of the entrance-side polarizing plate 101 and the orientation direction of the liquid crystal material 111; d represents a distance between the pixel electrode 114 and the counter electrode 115 (i.e., a thickness of the liquid crystal layer 110); Δn represents a refractive index anisotropy of the liquid crystal material 111 viewed from the entering direction; and λ represents a wavelength of the projection light beam.

Figure 7:
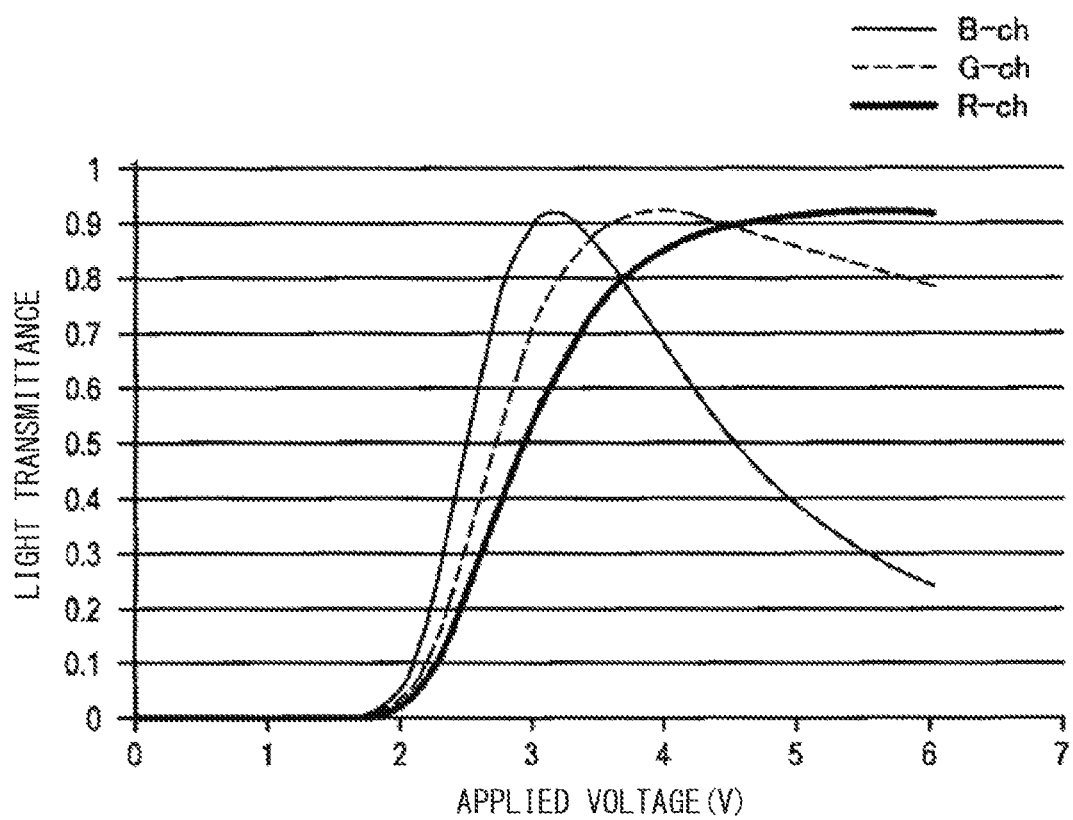
FIG. 7 is a graph diagram schematically illustrating a relationship between an applied voltage and a light transmittance in each of liquid crystal panels that modulate respective color light beams.

As indicated in Expression 1, light transparency of the liquid crystal panel 100 depends on the wavelength of the projection light beam entering the liquid crystal panel 100. Thus, a relationship between an applied voltage on each of the liquid crystal panels 100 for the respective color light beams and a light transmittance of each liquid crystal panel 100 is as indicated in FIG. 7. FIG. 7 is a graph diagram schematically illustrating the relationship between the applied voltage and the light transmittance in each of the liquid crystal panels 100 that modulate the respective light color beams. In FIG. 7, a characteristic of the liquid crystal panel that modulates the red light beam hR is represented by R-ch, a characteristic of the liquid crystal panel that modulates the green light beam hG is represented by G-ch, and a characteristic of the liquid crystal panel that modulates the blue light beam hB is represented by B-ch.

Referring to FIG. 7, the liquid crystal panel that modulates the blue light beam hB has the light transmittance that reaches a peak at the applied voltage near 3 V, the liquid crystal panel that modulates the green light beam hG has the light transmittance that reaches a peak at the applied voltage near 4 V, and the liquid crystal panel that modulates the red light beam hR has the light transmittance that reaches a peak at the applied voltage of about 5 V. That is, the liquid crystal panel 100 that modulates a light beam having a shorter wavelength has the light transmittance that reaches the peak at a lower applied voltage. Accordingly, in a case where an identical driving voltage is applied to the liquid crystal panels 100 having the characteristics indicated in FIG. 7 to modulate the respective color light beams, it is difficult to maximize light transmittances of the liquid crystal panels 100 for all of the color light beams.

For this reason, for example, it is conceivable to adjust a driving voltage level for each of the liquid crystal panels 100 that modulate the respective color light beams so that each light transmittance of each of the liquid crystal panels 100 that modulate the respective color light beams may be able to have the highest value. Specifically, it is conceivable that the liquid crystal panel 100 that modulates the red light beam hR is driven by an applied voltage of 0 V to 5 V, the liquid crystal panel 100 that modulates the green light beam hG is driven by the applied voltage of 0 V to 4 V, and the liquid crystal panel 100 that modulates the blue light beam hB is driven by the applied voltage of 0 V to 3 V.

However, in order to adjust the driving voltage for each of the liquid crystal panels 100 that modulate the respective color light beams as described above, it may be necessary to grasp the characteristics of the respective light transmittances of the liquid crystal panels 100, and thus the adjustment of the liquid crystal panels 100 becomes complicated.

As a second circumstance, the projection liquid crystal display device 1 generates a color image by splitting the white light beam h outputted from the light source 40 into the red light beam hR, the green light beam hG, and the blue light beam hB, modulating and then combining the split color light beams. Accordingly, in a case where magnitudes of light losses on optical paths of the respective color light beams are different from each other, energy differences between the color light beams may occur. In such a case, upon combining the color light beams, a white balance of the combined projection light beam may differ from a white balance of the white light beam h outputted from the light source 40. For this reason, the light transmittances of the liquid crystal panels 100 that modulate the respective color light beams are to be set to an appropriate level so that the white balance of the color image of the projection liquid crystal display device 1 becomes appropriate.

Figure 8:
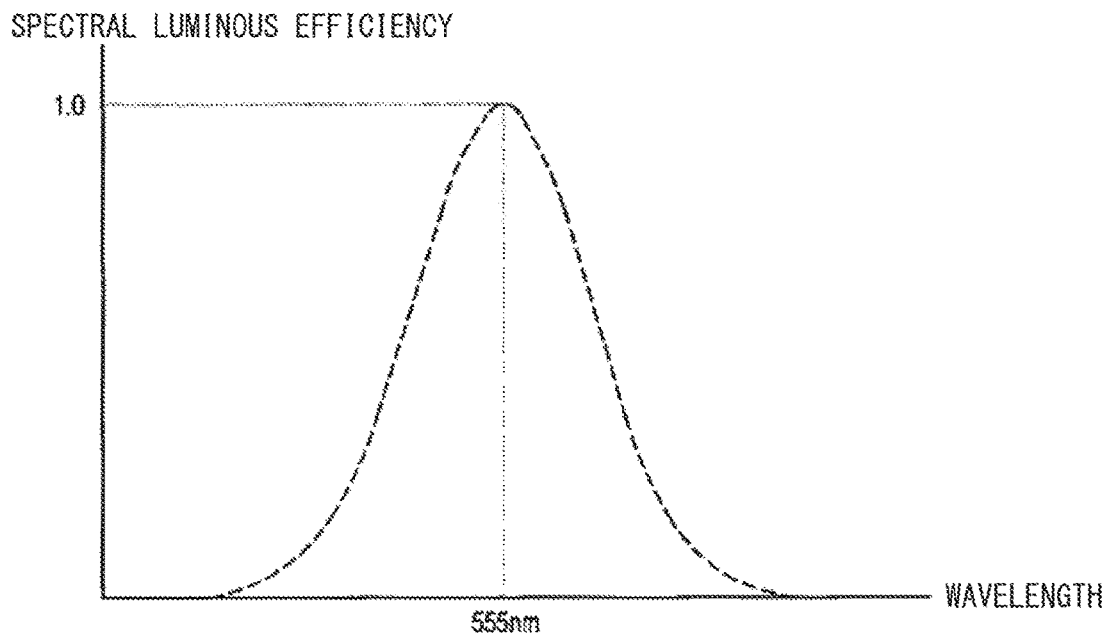
FIG. 8 is a graph diagram illustrating a spectral luminous efficiency curve in light wavelengths of 380 nm to 780 nm.

Further, as a third circumstance, a human eye has a perception gap in intensities depending on wavelengths even if light beams have the same intensity. Specifically, a perceived intensity of light by the human eye may be modeled as a spectral luminous efficiency curve illustrated in FIG. 8. FIG. 8 is a graph diagram illustrating a spectral luminous efficiency curve in light wavelengths of 380 nm to 780 nm.

As illustrated in FIG. 8, the human eye has the highest sensitivity to light at a wavelength of 555 nm, and has a lower sensitivity to light at a wavelength away from 555 nm. Therefore, in order to adjust the white balance of the color image of the projection liquid crystal display device 1 to an appropriate state, the amount of light of the green light beam hG is also to be reduced with respect to the amounts of light of the red light beam hR and the blue light beam hB in view of the spectral luminous efficiency of the human eye.

Here, as a measure for reducing the amount of light of green light beam hG, for example, it is conceivable to place an attenuation filter that reduces the amount of light on the optical path of the green light beam hG. However, the provision of the attenuation filter adds a new component on the optical path of the green light beam hG, thereby increasing an entire mass and a manufacturing cost of the projection liquid crystal display device 1.

As another measure, it is conceivable that the highest value of the light transmittance of the liquid crystal panel 100 that modulates the green light beam hG is lowered below the highest values of the light transmittances of the light modulator 10 that modulates the red light beam hR and the liquid crystal panel 100 that modulates the blue light beam hB, by lowering the level of driving voltage of the liquid crystal panel 100 that modulates the green light beam hG.

Specifically, in the liquid crystal panels 100 having the characteristics illustrated in FIG. 7, it is conceivable to reduce the amount of light of the green light beam hG by driving the liquid crystal panel 100 that modulates the green light beam hG at the applied voltage of 0 V to 3 V.

However, in such a case, the liquid crystal panel 100 that modulates the green light beam hG is used in an unstable region in which the characteristic of the applied voltage and the light transmittance is easily changed. Accordingly, if the characteristic of the liquid crystal panel 100 that modulates the green light beam hG is changed due to aging or environmental factors, the light transmittance of the liquid crystal panel 100 may vary greatly and the white balance of the projection liquid crystal display device 1 may vary greatly.

As described above, in the projection liquid crystal display device 1, it is desired to appropriately adjust the balances of the amounts of light of the red light beam hR, the green light beam hG, and the blue light beam hB while adjusting the applied voltage-light transmittance characteristics that differ in each of the liquid crystal panels 100 that modulates the respective color light beams. Further, in the projection liquid crystal display device 1, it is also desired that the liquid crystal panels 100 that modulates the respective color light beams have a substantially common configuration in order to improve productivity. In addition, it is desired that the projection liquid crystal display device 1 have high light resistance, as a large amount of light is to be applied to the liquid crystal panel 100 for a long time. In particular, since the projection liquid crystal display device 1 is becoming higher in definition and luminance in accordance with recent marketing requirements, the amount of light applied to the liquid crystal panel 100 provided in the projection liquid crystal display device 1 is increasing, and higher light resistance is demanded. For example, the liquid crystal panel 100 which the blue light beam having a short wavelength enters has a greater influence due to the light irradiation; therefore, if the liquid crystal panel 100 is not provided with sufficient light resistance, there is a possibility that color reproducibility of the projection liquid crystal display device 1 may be lowered.

In view of these circumstances, it is extremely cumbersome to perform adjustment and optimization in each of the liquid crystal panels 100 that modulate the respective color light beams, which increases time and cost for the adjustment of the projection liquid crystal display device 1.

The technology according to the present disclosure has been made in view of the above-mentioned circumstances. The technology according to the present disclosure to be described below proposes the projection liquid crystal display device 1 that is able to achieve desired characteristics more easily.

2.2. First Specific Example

Figure 9:
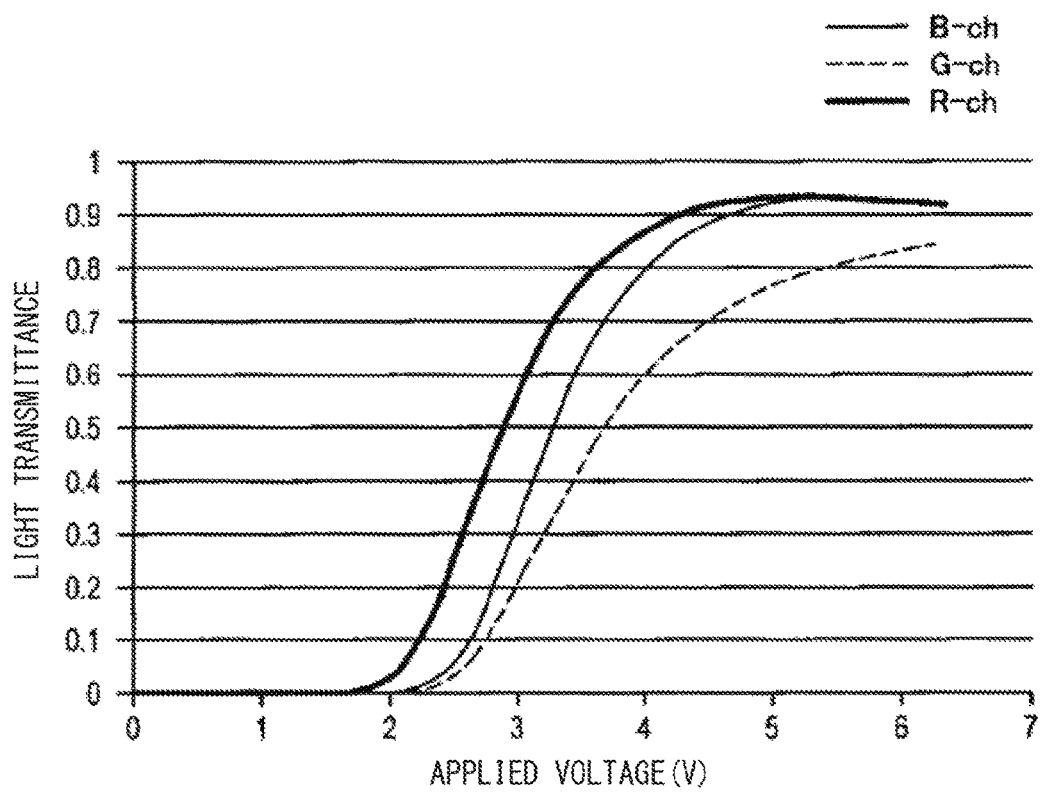
FIG. 9 is a graph diagram schematically illustrating relationships between applied voltages and light transmittances of respective liquid crystal panels to which a first specific example of a technology of the present disclosure is applied.

First, referring to FIG. 9, a first specific example of the technology according to the present disclosure will be described. FIG. 9 is a graph diagram schematically illustrating relationships between applied voltages and light transmittances of the respective liquid crystal panels 100 to which the first specific example of the technology according to the present disclosure is applied.

The technology according to the present disclosure is to provide the projection liquid crystal display device 1 in which a configuration of a liquid crystal panel 100 that modulates the red light beam hR (hereinafter referred to as red liquid crystal panel 100R) differs from respective configurations of a liquid crystal panel 100 that modulates the green light beam hG (hereinafter referred to as green liquid crystal panel 100G) and a liquid crystal panel 100 that modulates the blue light beam hB (hereinafter referred to as blue liquid crystal panel 100B), in order to drive the red liquid crystal panel 100R, the green liquid crystal panel 100G, and the blue liquid crystal panel 100B at the same driving voltage.

In the first specific example, the configuration of the red liquid crystal panel 100R is made different from the respective configurations of the green liquid crystal panel 100G and the blue liquid crystal panel 100B, by using, as the liquid crystal material 111 included in the red liquid crystal panel 100R, a liquid crystal material having a higher refractive index anisotropy (e.g., a value measured by the green light beam of 550 nm) than respective refractive index anisotropies of the liquid crystal materials 111 included in the green liquid crystal panel 100G and the blue liquid crystal panel 100B.

In this case, the respective distances (also referred to as cell gaps) between the pixel electrodes 114 and the counter electrodes 115 of the red liquid crystal panel 100R, the green liquid crystal panel 100G, and the blue liquid crystal panel 100B may be the same. That is, in the case where the liquid crystal materials 111 cause the configuration of the red liquid crystal panel 100R to differ from the respective configurations of the green liquid crystal panel 100G and the blue liquid crystal panel 100B, the respective cell gaps of the red liquid crystal panel 100R, the green liquid crystal panel 100G, and the blue liquid crystal panel 100B may be the same.

A size of the cell gap of the liquid crystal panel 100 is easily limited from a viewpoint of an image quality. Specifically, in a case where the cell gap of the liquid crystal panel 100 is excessively large, the orientation of the liquid crystal molecules around the pixels may be disturbed by a lateral electric field generated between pixels that are adjacent to each other, and the image quality may be deteriorated. Further, in a case where the cell gap of the liquid crystal panel 100 is excessively small, a liquid crystal material having a high refractive index anisotropy will be used in order to obtain a satisfactory light transmittance in the liquid crystal layer 110, but a liquid crystal material having a high refractive index anisotropy generally has a low stability or low light resistance, which may deteriorate the reliability of the liquid crystal panel 100. Thus, the red liquid crystal panel 100R may be provided differently from the green liquid crystal panel 100G and the blue liquid crystal panel 100B by the liquid crystal material 111 having less limitation.

It is to be noted that, in the red liquid crystal panel 100R, it is considered that the use of the liquid crystal material having a high refractive index anisotropy has almost no effect on the image quality. This is because the red light beam hR has low energy energetic as compared to the green light beam hG and the blue light beam hB, and damage to the liquid crystal panel 100 is very small. Specifically, in the projection liquid crystal display device 1, in a case where strong light is applied to the liquid crystal panel 100 for a long time, free radicals are generated from a sealing material or a sealing agent which is a peripheral material dissolved in the liquid crystal material 111, an environmental impurity or the like due to the blue light beam hB or the like having a short wavelength. The thus generated free radicals break chemical bonds in the liquid crystal material 111, thereby reducing the characteristics of the liquid crystal panel 100.

In contrast, the respective configurations of the green liquid crystal panel 100G and the blue liquid crystal panel 100B may be the same. In the case where the respective configurations of the green liquid crystal panel 100G and the blue liquid crystal panel 100B are the same, it is possible to manufacture the green liquid crystal panel 100G and the blue liquid crystal panel 100B in the same manufacturing process, which makes it possible to improve the productivity of the projection liquid crystal display device 1.

It is to be noted that the configuration of the red liquid crystal panel 100R other than the liquid crystal material 111 may be the same as the respective configurations of the green liquid crystal panel 100G and the blue liquid crystal panel 100B other than the liquid crystal materials 111. Increasing common parts in the respective configurations of the red liquid crystal panel 100R, the green liquid crystal panel 100G, and the blue liquid crystal panel 100B improves production efficiencies, which makes it possible to improve the productivity of the projection liquid crystal display device 1.

As described above with reference to FIG. 7, in the liquid crystal panels 100, the applied voltage at which the light transmittance becomes the highest value becomes higher as the wavelength of the light beam to be modulated becomes longer. In the first specific example, by changing only the liquid crystal material 111 of the red liquid crystal panel 100R, it is possible to make closer the respective applied voltage-light transmittance characteristics of the red liquid crystal panel 100R, the green liquid crystal panel 100G, and the blue liquid crystal panel 100B. According to this, in the first specific example, it is possible to bring closer to each other the values of the applied voltage at which the light transmittances become the highest values among the red liquid crystal panel 100R, the green liquid crystal panel 100G, and the blue liquid crystal panel 100B.

Specifically, as illustrated in FIG. 9, in the first specific example, it is possible to make the applied voltage at which the light transmittance becomes the highest value (may be a peak, the same is applied hereinafter) in the red liquid crystal panel 100R lower than the applied voltage at which the light transmittance becomes the highest value in the blue liquid crystal panel 100B. In FIG. 9, the characteristic of the red liquid crystal panel 100R is represented by R-ch, the characteristic of the green liquid crystal panel 100G is represented by G-ch, and the characteristic of the blue liquid crystal panel 100B is represented by R-ch.

In the projection liquid crystal display device 1, an upper limit of a voltage that can be supplied to the liquid crystal panel 100 and the like is determined. For this reason, for example, it is considered that the configurations of the liquid crystal panels 100 that modulate the respective color light beams are optimized so that the applied voltage at which the light transmittance becomes the highest value in the red liquid crystal panel 100R that modulates the red light beam having the longest wavelength becomes the maximum voltage. In contrast, in the first specific example, it is possible to optimize the configurations of the liquid crystal panels 100 that modulate the respective color light beams such that the applied voltage at which the light transmittance becomes the highest value in the blue liquid crystal panel 100B becomes the maximum voltage, by controlling the applied voltage-light transmittance characteristic of the red liquid crystal panel 100R. According to this, it is possible to adjust the applied voltage-light transmittance characteristics of the red liquid crystal panel 100R and the blue liquid crystal panel 100B so that light transmittances of both red liquid crystal panel 100R and blue liquid crystal panel 100B each become the highest value in the applied voltage of about 5 V.

At this time, at the applied voltage of about 5 V, the light transmittance of the green liquid crystal panel 100G has not reached the highest value and is lower than the light transmittances of the red liquid crystal panel 100R and the blue liquid crystal panel 100B. However, as described above, in the projection liquid crystal display device 1, it is preferable that the amount of light of the green light beam hG be smaller than the amounts of light of the red light beam hR and the blue light beam hB, in order to be adaptable to the spectral luminous efficiency of the human eye. Therefore, according to the projection liquid crystal display device 1 of the first specific example, it is possible to achieve the white balance in accordance with the spectral luminous efficiency of the human eye without using an attenuation filter or the like or reducing the driving voltage level of only the green liquid crystal panel 100G.

Further, as illustrated in FIG. 9, in the first specific example, the variability of the light transmittance with respect to the applied voltage in the green liquid crystal panel 100G is moderate as compared to the applied voltage-light transmittance characteristics illustrated in FIG. 7. Therefore, the projection liquid crystal display device 1 according to the first specific example is able to suppress effects on the image quality even in a case where the applied voltage-light transmittance characteristics of the liquid crystal panels 100 change due to aging or environmental factors.

This is because, in the graph illustrated in FIG. 7, the configurations of the liquid crystal panels 100 that modulates the respective color light beams are optimized so that the applied voltage at which the light transmittance becomes the highest value in the red liquid crystal panel 100R becomes the maximum voltage. In other words, in the graph illustrated in FIG. 7, sensitivities to changes in the light transmittances with respect to the applied voltages of the green liquid crystal panel 100G and the blue liquid crystal panel 100B become high, since the applied voltage-light transmittance characteristics of the green liquid crystal panel 100G and the blue liquid crystal panel 100B are adjusted in accordance with the red liquid crystal panel 100R in which a sensitivity to a change in the light transmittance with respect to the applied voltage is low.

In contrast, in the first specific example, the configurations of the liquid crystal panels 100 that modulate the respective color light beams are optimized so that the applied voltage at which the light transmittance becomes the highest value in the blue liquid crystal panel 100B becomes the maximum voltage. In other words, it is possible to make the sensitivity to the change in the light transmittance with respect to the applied voltage of the green liquid crystal panel 100G more moderate, since the applied voltage-light transmittance characteristic of the green liquid crystal panel 100G is adjusted in accordance with the blue liquid crystal panel 100B in which the sensitivity to the change in the light transmittance with respect to the applied voltage is high.

2.3. Second Specific Example

Next, a second specific example of the technology according to the present disclosure will be described.

As described above, the technology according to the present disclosure is to provide the projection liquid crystal display device 1 in which the configuration the red liquid crystal panel 100R differs from the respective configurations of the green liquid crystal panel 100G and the blue liquid crystal panel 100B, in order to drive the red liquid crystal panel 100R, the green liquid crystal panel 100G, and the blue liquid crystal panel 100B at the same driving voltage.

In the second specific example, the configuration of the red liquid crystal panel 100R is made different from the respective configurations of the green liquid crystal panel 100G and the blue liquid crystal panel 100B, by making a cell gap of the liquid crystal layer 110 of the red liquid crystal panel 100R larger than respective cell gaps of the liquid crystal layers 110 of the green liquid crystal panel 100G and the blue liquid crystal panel 100B.

In this case, the respective liquid crystal materials 111 of the red liquid crystal panel 100R, the green liquid crystal panel 100G, and the blue liquid crystal panel 100B may be the same. That is, in the case where the cell gaps cause the configuration of the red liquid crystal panel 100R to differ from the respective configurations of the green liquid crystal panel 100G and the blue liquid crystal panel 100B, the respective liquid crystal materials 111 of the red liquid crystal panel 100R, the green liquid crystal panel 100G, and the blue liquid crystal panel 100B may be the same. According to this, it is possible to simplify a process of injecting the liquid crystal material 111 at the time of manufacturing the red liquid crystal panel 100R, the green liquid crystal panel 100G, and the blue liquid crystal panel 100B.

In contrast, the respective configurations of the green liquid crystal panel 100G and the blue liquid crystal panel 100B may be the same. In the case where the respective configurations of the green liquid crystal panel 100G and the blue liquid crystal panel 100B are the same, it is possible to manufacture the green liquid crystal panel 100G and the blue liquid crystal panel 100B in the same manufacturing process, which makes it possible to improve the productivity of the projection liquid crystal display device 1.

It is to be noted that the configuration of the red liquid crystal panel 100R other than the liquid crystal material 111 may be the same as the respective configurations of the green liquid crystal panel 100G and the blue liquid crystal panel 100B other than the liquid crystal materials 111.

Increasing common parts in the respective configurations of the red liquid crystal panel 100R, the green liquid crystal panel 100G, and the blue liquid crystal panel 100B improves production efficiencies, which makes it possible to improve the productivity of the projection liquid crystal display device 1.

3. Examples

In the following, the technology according to the present disclosure will be described in more detail by referring to Examples and Comparative Example. It is to be noted that the following Examples are merely examples, and the technology according to the present disclosure is not limited to the examples described below.

Methods of manufacturing a liquid crystal panel according to Examples and Comparative Example will be described.

First, a photoresist was applied to a counter substrate at a desired thickness using a spin-coating method, and after exposure treatment by ultraviolet irradiation using a photomask, the photoresist was developed to form a transparent resist layer serving as a columnar spacer. Next, a TFT array substrate in which TFT was formed in an array form on a quartz substrate, and the above-mentioned counter substrate were washed with a neutral detergent, and then dried at 120° C. for 20 minutes.

Subsequently, each of the TFT array substrate and the counter substrate was introduced into a deposition apparatus, by obliquely depositing $SiO_2$ with a thickness of about 50 nm, to form an oriented film. Next, a sealing pattern was formed on each of the respective surfaces of the TFT array substrate and the counter substrate on which the oriented films were formed, except for an inlet for injecting the liquid crystal material in a subsequent stage. Thereafter, the TFT array substrate and the counter substrate were bonded to each other so that the surfaces on which the respective oriented films were formed oppose each other, the liquid crystal material was injected from the inlet in a vacuum environment, and sealing was performed with a UV (Ultra Violet) curable resin. It is to be noted that a nematic liquid crystal material having a negative dielectric anisotropy was used as the liquid crystal material.

Using the above manufacturing method, the liquid crystal panels that modulate the respective color light beams according to Examples 1 and 2 and Comparative Example 1 were manufactured by varying the liquid crystal material and the cell gap. Physical property values of the liquid crystal materials and values of the cell gaps of the respective liquid crystal panels are indicated in Tables 1 and 2 below. It is to be noted that the refractive index anisotropy (Δn) of the liquid crystal material is measured by a light beam having a wavelength of 550 nm.

TABLE 1

|  | Example 1 | | | Example 2 | | |
| --- | --- | --- | --- | --- | --- | --- |
|  | Red liquid crystal panel | Green liquid crystal panel | Blue liquid crystal panel | Red liquid crystal panel | Green liquid crystal panel | Blue liquid crystal panel |
| Cell gap [μm] | 3.0 | 3.0 | 3.0 | 4.5 | 3.0 | 3.0 |
| Refractive index aniotropy (Δn) | 0.18 | 0.10 | 0.10 | 0.10 | 0.10 | 0.10 |
| Dielectric constant anisotropy (Δε) | −4 | −4 | −4 | −4 | −4 | −4 |

TABLE 2

|  | Comparative Example 1 | | |
| --- | --- | --- | --- |
|  | Red liquid crystal panel | Green liquid crystal panel | Blue liquid crystal panel |
| Cell gap [μm] | 3.3 | 3.3 | 3.3 |
| Refractive index anisotropy (Δn) | 0.13 | 0.13 | 0.13 |
| Dielectric constant anisotropy (Δε) | −4 | −4 | −4 |

Figure 10:
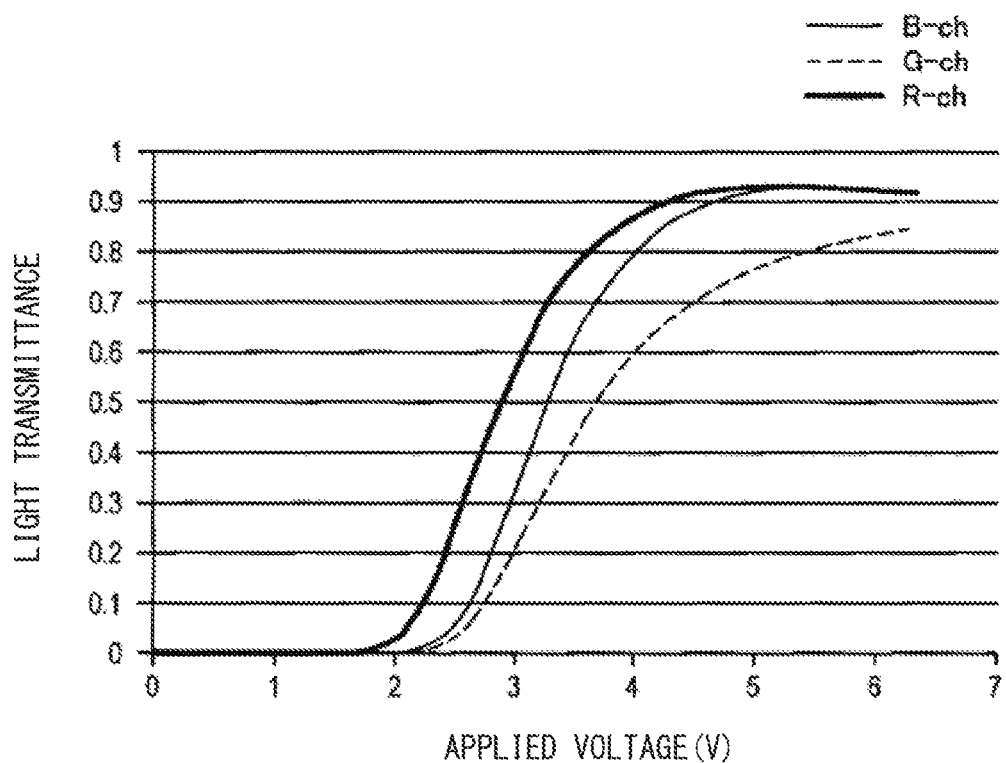
FIG. 10 is a graph of applied voltage-light transmittance characteristics of a red light beam, a green light beam, and a blue light beam of respective liquid crystal panels according to Example 1.
Figure 11:
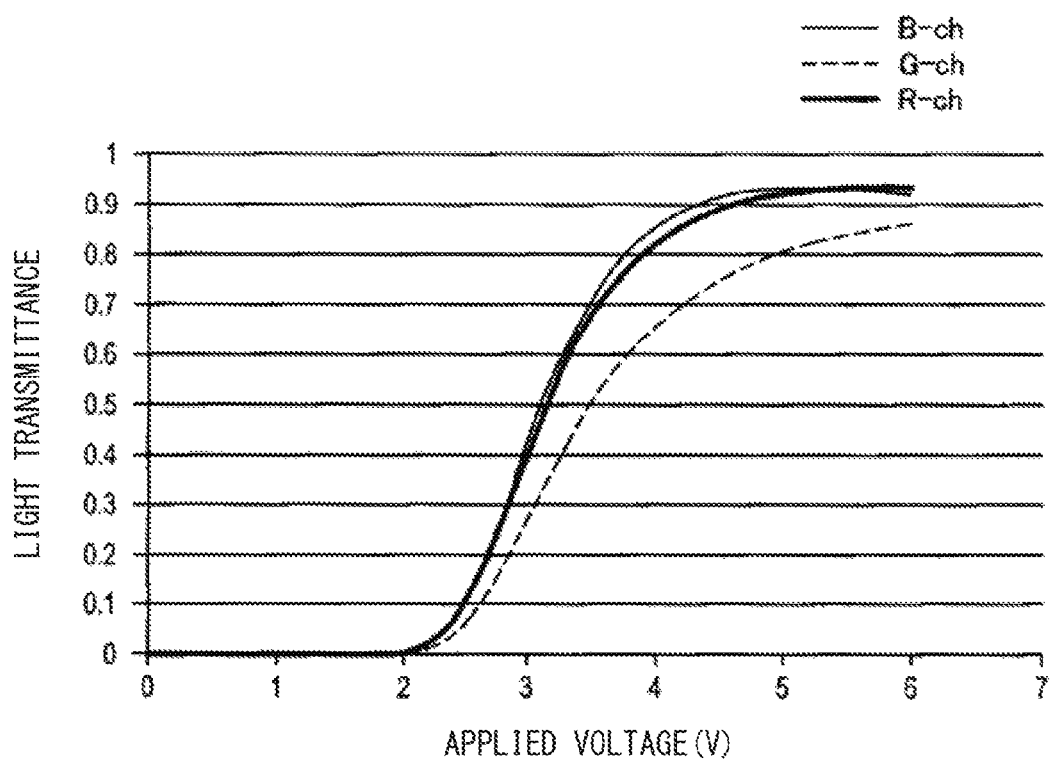
FIG. 11 is a graph of applied voltage-light transmittance characteristics of a red light beam, a green light beam, and a blue light beam of respective liquid crystal panels according to Example 2.
Figure 12:
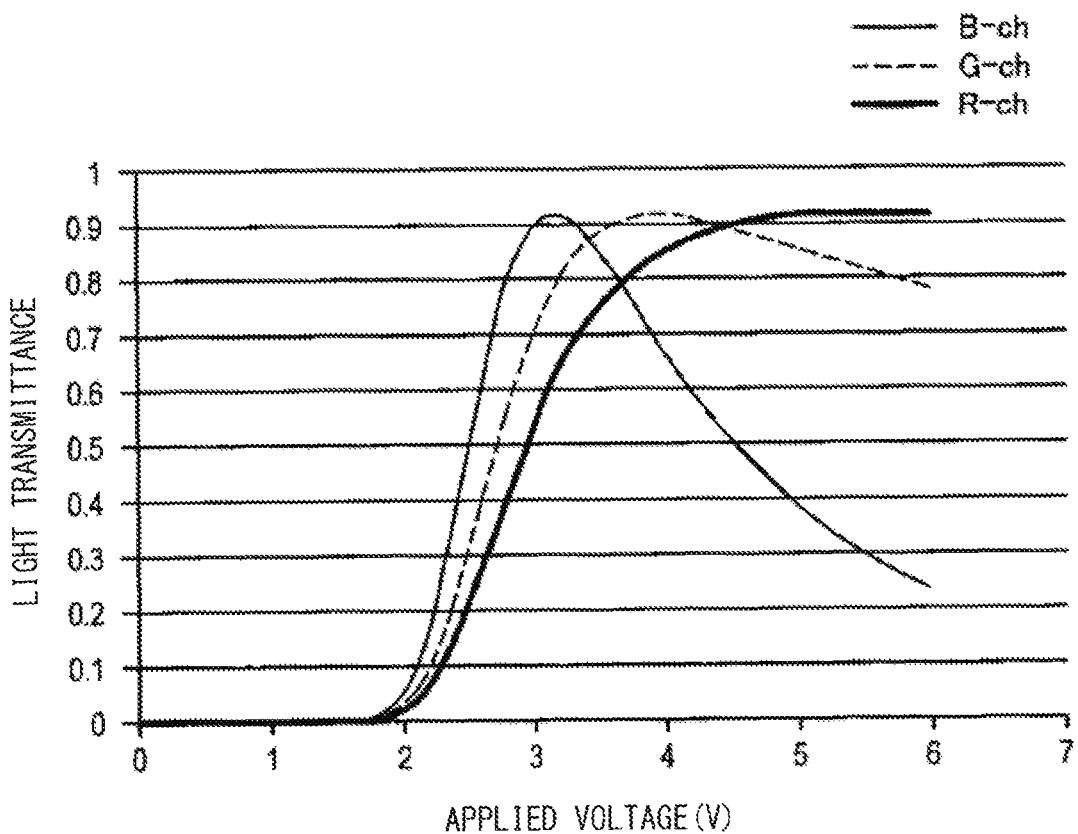
FIG. 12 is a graph of applied voltage-light transmittance characteristics of a red light beam, a green light beam, and a blue light beam of respective liquid crystal panels according to Comparative Example 1.

The applied voltage-light transmittance characteristics of the respective liquid crystal panels that modulate the respective color light beams according to Examples 1 and 2 and Comparative Example 1 were derived by simulations. FIGS. 10 to 12 illustrate graph diagrams indicating the results. FIG. 10 is a graph of applied voltage-light transmittance characteristics of the respective liquid crystal panels according to Example 1, FIG. 11 is a graph of applied voltage-light transmittance characteristics of the respective liquid crystal panels according to Example 2, and FIG. 12 is a graph of applied voltage-light transmittance characteristics of the respective liquid crystal panels according to Comparative Example 1. It is to be noted that, in FIGS. 10 to 12, the characteristic of the red liquid crystal panel is represented by R-ch, the characteristic of the green liquid crystal panel is represented by G-ch, and the characteristic of the blue liquid crystal panel is represented by R-ch.

As indicated in FIG. 10 and FIG. 11, in the liquid crystal panels according to Examples 1 and 2, the light transmittances of the red light beam and the blue light beam become substantially the highest values at the applied voltage of 5 V, and the light transmittance of green light beam becomes about 70% of the peak value. Therefore, it is appreciated that in each of the liquid crystal panels according to Examples 1 and 2, it is possible to obtain an image having a favorable white balance in which the amounts of light of the red light beam and the blue light beam are large and the amount of light of the green light beam is small, even in the case where the liquid crystal panels corresponding to the respective color light beams are driven at constant voltages.

In contrast, as indicated in FIG. 12, in the liquid crystal panel according to Comparative Example 1, the light transmittance of the blue light beam becomes substantially the highest value at the applied voltage of 3 V, and the light transmittance of the green light beam becomes about 70% of the peak value. However, the light transmittance of the red light beam becomes substantially the highest value at the applied voltage of 5 V. Therefore, it is appreciated in the liquid crystal panel according to Comparative Example 1, it is difficult to obtain an image having a favorable white balance in which the amounts of light of the red light beam and the blue light beam are large and the amount of light of the green light beam is small, unless the liquid crystal panels corresponding to the respective color light beams are driven at different voltages.

(Reliability Evaluation of White Balance)

Subsequently, referring to Table 3, the results of evaluating environmental tests of the liquid crystal panels according to Example 1 and Comparative Example 1 will be described. Specifically, a projection liquid crystal display device including the liquid crystal panels according to Example 1 and a projection liquid crystal display device including the liquid crystal panels according to Comparative Example 1 were left in a high-temperature and high-humidity environment at a temperature of 60° C. and a humidity of 90% for a long time, and then qualities of white images were visually evaluated. The results are provided in Table 3.

TABLE 3

|  | 0 h | 100 h | 250 h | 500 h |
|---|---|---|---|---|
| Example 1 | OK | OK | OK | OK |
| Comparative Example 1 | OK | OK | Not satisfactory | Not satisfactory |

As indicated in Table 3, in the projection liquid crystal display device including the liquid crystal panels according to Comparative Example 1, it was confirmed that magenta coloring was observed in the white image after 250 hours (250 h) (not satisfactory). This is considered to be because, in the projection liquid crystal display device including the liquid crystal panels according to Comparative Example 1, the light transmittance of the liquid crystal panel that modulates the green light beam was lowered due to the temporal change, and the white balance of the image was disturbed.

In contrast, in the projection liquid crystal display device including the liquid crystal panels according to Example 1, no coloring was observed in the white image even after 500 hours (500 h) elapsed (OK). This is considered to be because, in the projection liquid crystal display device including the liquid crystal panels according to Example 1, the variability of the light transmittance of the liquid crystal panel that modulates the green light beam was set to be small, and the white balance of the image was not disturbed.

(Evaluation of Light Resistance)

Further, referring to FIG. 13 and FIG. 14, the results of evaluating light resistance of the liquid crystal panels according to Example 1 and Comparative Example 1 will be described. Specifically, temporal change in light transmittances of the respective color light beams were measured upon using for a long time the projection liquid crystal display device including the liquid crystal panels according to Example 1 and the projection liquid crystal display device including the liquid crystal panels according to Comparative Example 1.

Figure 13:
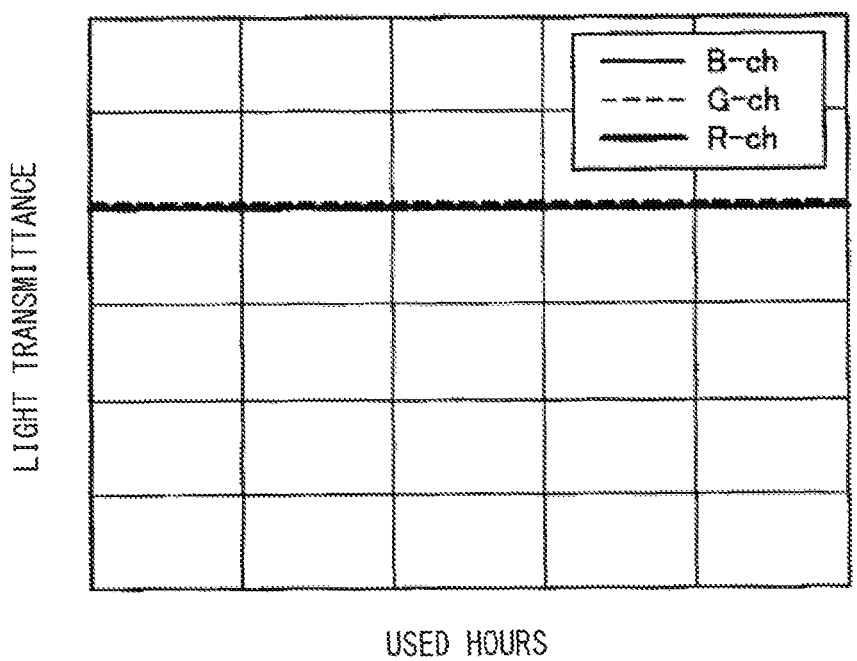
FIG. 13 is a graph diagram schematically illustrating temporal change in light transmittances of respective color light beams in a projection liquid crystal display device including the liquid crystal panels according to Example 1.

FIG. 13 is a graph diagram schematically illustrating the temporal change in light transmittances of the liquid crystal panels that modulate the respective color light beams in the projection liquid crystal display device including the liquid crystal panels according to Example 1. FIG. 14 is a graph diagram schematically illustrating the temporal change in light transmittances of the liquid crystal panels that modulate the respective color light beams in the projection liquid crystal display device including the liquid crystal panels according to Comparative Example 1. In FIGS. 13 and 14, the horizontal axis indicates used hours of the projection liquid crystal display device, and the vertical axis indicates the highest value of the light transmittance of each of the liquid crystal panels that modulate the respective color light beams. In FIGS. 13 and 14, the characteristic of the liquid crystal panel that modulates the red light beam is represented by R-ch, the characteristic of the liquid crystal panel that modulates the green light beam is represented by G-ch, and the characteristic of the liquid crystal panel that modulates the blue light beam is represented by R-ch.

Figure 14:
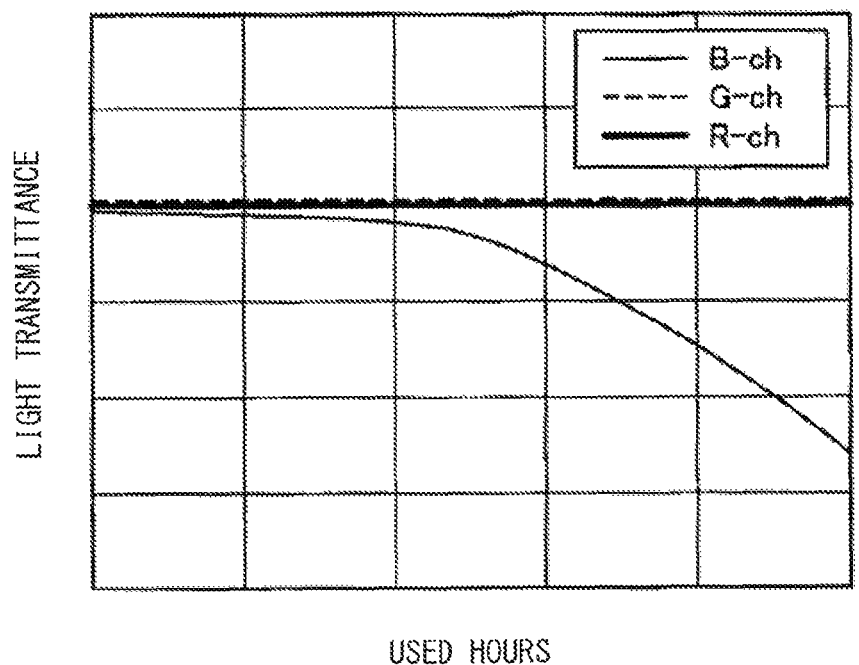
FIG. 14 is a graph diagram schematically illustrating temporal change in light transmittances of respective color light beams in a projection liquid crystal display device including the liquid crystal panels according to Comparative Example 1.

As indicated in FIG. 13 and FIG. 14, in the projection liquid crystal display device including the liquid crystal panels according to Comparative Example 1, it is appreciated that the liquid crystal panel that modulates the blue light beam is deteriorated earlier than the liquid crystal panel that modulates the red light beam and the liquid crystal panel that modulates the green light beam, and that the highest value of the light transmittance of the liquid crystal panel that modulates the blue light beam is lowered. In contrast, in the projection liquid crystal display device including the liquid crystal panels according to Example 1, it is appreciated that the highest values of the light transmittances are maintained and is not deteriorated in any of the liquid crystal panel that modulates the red light beam, the liquid crystal panel that modulates the green light beam, and the liquid crystal panel that modulates the blue light beam.

In Comparative Example 1, since a liquid crystal material having a refractive index anisotropy Δn larger than that of Example 1 is used as a liquid crystal material of the liquid crystal panel that modulates the blue light beam, it is considered that photo-deterioration has occurred early.

A preferred embodiment(s) of the present disclosure has/have been described above in detail with reference to the accompanying drawings, but the technical scope of the present disclosure is not limited to such an embodiment(s). It is apparent that a person having ordinary skill in the art of the present disclosure can arrive at various alterations and modifications within the scope of the technical idea described in the appended claims, and it is understood that such alterations and modifications naturally fall within the technical scope of the present disclosure.

For example, an item to which the technology according to the present disclosure is applied is the projection liquid crystal display device in the above description, but the present technology is not limited to such an example. For example, the technology according to the present disclosure may be applied to general electronic apparatuses including other display devices.

Furthermore, the effects described herein are merely illustrative and exemplary, and not limiting. That is, the technique according to the present disclosure can exert other effects that are apparent to those skilled in the art from the description herein, in addition to the above-described effects or in place of the above-described effects.

It is to be noted that the following configurations also belong to the technical scope of the present disclosure.

(1)

A projection liquid crystal display device including:

a first optical system that splits a light beam outputted from a light source into a red light beam, a green light beam, and a blue light beam;

a red liquid crystal panel that modulates the red light beam;

a green liquid crystal panel that modulates the green light beam;

a blue liquid crystal panel that modulates the blue light beam;

a second optical system that combines the modulated red light beam, the modulated green light beam, and the modulated blue light beam into one optical path; and a projection lens system that projects a light beam outputted from the second optical system on a projection surface, in which a driving voltage of the red liquid crystal panel, a driving voltage of the green liquid crystal panel, and a driving voltage of the blue liquid crystal panel are identical to each other, and a configuration of a liquid crystal layer of the red liquid crystal panel is different from a configuration of a liquid crystal layer of the green liquid crystal panel and a configuration of a liquid crystal layer of the blue liquid crystal panel.

(2)

The projection liquid crystal display device according to (1), in which a refractive index anisotropy of a liquid crystal material included in the liquid crystal layer of the red liquid crystal panel is higher than a refractive index anisotropy of a liquid crystal material included in the liquid crystal layer of the green liquid crystal panel and a refractive index anisotropy of a liquid crystal material included in the liquid crystal layer of the blue liquid crystal panel.

(3)

The projection liquid crystal display device according to (2), in which a cell gap of the red liquid crystal panel, a cell gap of the green liquid crystal panel, and a cell gap of the blue liquid crystal panel are identical to each other.

(4)

The projection liquid crystal display device according to (1), in which a cell gap of the liquid crystal layer of the red liquid crystal panel is larger than a cell gap of the liquid crystal layer of the green liquid crystal panel and a cell gap of the liquid crystal layer of the blue liquid crystal panel.

(5)

The projection liquid crystal display device according to (4), in which a refractive index anisotropy of a liquid crystal material included in the liquid crystal layer of the red liquid crystal panel, a refractive index anisotropy of a liquid crystal material included in the liquid crystal layer of the green liquid crystal panel, and a refractive index anisotropy of a liquid crystal material included in the liquid crystal layer of the blue liquid crystal panel are identical to each other.

(6)

The projection liquid crystal display device according to any one of (1) to (5), in which a configuration of the green liquid crystal panel is identical to a configuration of the liquid crystal layer of the blue liquid crystal panel.

(7)

The projection liquid crystal display device according to any one of (1) to (6), in which a configuration of the red liquid crystal panel other than the liquid crystal layer is identical to a configuration of the green liquid crystal panel other than the liquid crystal layer and a configuration of the blue liquid crystal panel other than the liquid crystal layer.

(8)

The projection liquid crystal display device according to any one of (1) to (7), in which a highest value of a light transmittance of the green liquid crystal panel is lower than a highest value of a light transmittance of the red liquid crystal panel and a highest value of a light transmittance of the blue liquid crystal panel.

(9)

The projection liquid crystal display device according to any one of (1) to (8), in which a driving mode of the red liquid crystal panel, a driving mode of the green liquid crystal panel, and a driving mode of the blue liquid crystal panel are each a vertical alignment type.

(10)

The projection liquid crystal display device according to any one of (1) to (9), in which the red liquid crystal panel, the green liquid crystal panel, and the blue liquid crystal panel each modulate a transmitted light beam.

(11)

The projection liquid crystal display device according to any one of (1) to (10), in which the red liquid crystal panel, the green liquid crystal panel, and the blue liquid crystal panel are each in a dark display state when no voltage is applied.

(12)

An electronic apparatus including:

a first optical system that splits a light beam outputted from a light source into a red light beam, a green light beam, and a blue light beam;

a red liquid crystal panel that modulates the red light beam;

a green liquid crystal panel that modulates the green light beam;

a blue liquid crystal panel that modulates the blue light beam;

a second optical system that combines the modulated red light beam, the modulated green light beam, and the modulated blue light beam into one optical path; and a projection lens system that projects a light beam outputted from the second optical system on a projection surface, in which a driving voltage of the red liquid crystal panel, a driving voltage of the green liquid crystal panel, and a driving voltage of the blue liquid crystal panel are identical to each other, and a configuration of a liquid crystal layer of the red liquid crystal panel is different from a configuration of a liquid crystal layer of the green liquid crystal panel and a configuration of a liquid crystal layer of the blue liquid crystal panel.

REFERENCE SIGNS LIST 1 projection liquid crystal display device
2 cut filter
3 first fly-eye lens
4 second fly-eye lens
5 polarization conversion element
6, 9, 12, 18 plano-convex lens
7, 11, 25, 26 dichroic mirror
8, 15, 17 mirror
10, 13, 19 light modulator
14, 16 lens
20 cross prism
21a, 21b interference filter
22 projection lens
30 projection surface
40 light source
100 liquid crystal panel
100B blue liquid crystal panel
100G green liquid crystal panel
100R red liquid crystal panel
101 entrance-side polarizing plate
102 liquid crystal cell
103 output-side polarizing plate
104, 105 dustproof glass 110 liquid crystal layer
111 liquid crystal material
112 circuit board
113 counter substrate
114 pixel electrode
115 counter electrode

The invention claimed is:

1. A projection liquid crystal display device, comprising:
a first optical system that splits a light beam outputted from a light source into a red light beam, a green light beam, and a blue light beam;
a red liquid crystal panel configured to modulate the red light beam;
a green liquid crystal panel configured to modulate the green light beam;
a blue liquid crystal panel configured to modulate the blue light beam;
a second optical system that combines the modulated red light beam, the modulated green light beam, and the modulated blue light beam into one optical path; and
a projection lens system that projects a light beam outputted from the second optical system on a projection surface, wherein
a driving voltage of the red liquid crystal panel, a driving voltage of the green liquid crystal panel, and a driving voltage of the blue liquid crystal panel are identical to each other,
a first configuration of a liquid crystal layer of the red liquid crystal panel is different from a first configuration of a liquid crystal layer of the green liquid crystal panel and a first configuration of a liquid crystal layer of the blue liquid crystal panel,
the first configuration of the liquid crystal layer of the green liquid crystal panel is identical to the first configuration of the liquid crystal layer of the blue liquid crystal panel, and
the first configuration corresponds to a cell gap of the liquid crystal layer.

2. The projection liquid crystal display device according to claim 1, wherein
a refractive index anisotropy of a liquid crystal material included in the liquid crystal layer of the red liquid crystal panel is higher than a refractive index anisotropy of a liquid crystal material included in the liquid crystal layer of the green liquid crystal panel and a refractive index anisotropy of a liquid crystal material included in the liquid crystal layer of the blue liquid crystal panel.

3. The projection liquid crystal display device according to claim 1, wherein
a cell gap of the liquid crystal layer of the red liquid crystal panel is larger than a cell gap of the liquid crystal layer of the green liquid crystal panel and a cell gap of the liquid crystal layer of the blue liquid crystal panel.

4. The projection liquid crystal display device according to claim 3, wherein a refractive index anisotropy of a liquid crystal material included in the liquid crystal layer of the red liquid crystal panel, a refractive index anisotropy of a liquid crystal material included in the liquid crystal layer of the green liquid crystal panel, and a refractive index anisotropy of a liquid crystal material included in the liquid crystal layer of the blue liquid crystal panel are identical to each other.

5. The projection liquid crystal display device according to claim 1, wherein
a second configuration of the red liquid crystal panel is identical to a second configuration of the green liquid crystal panel and a second configuration of the blue liquid crystal panel, and
the second configuration corresponds to the first configuration except the liquid crystal layer.

6. The projection liquid crystal display device according to claim 1, wherein
a highest value of a light transmittance of the green liquid crystal panel is lower than a highest value of a light transmittance of the red liquid crystal panel and a highest value of a light transmittance of the blue liquid crystal panel.

7. The projection liquid crystal display device according to claim 1, wherein a driving mode of the red liquid crystal panel, a driving mode of the green liquid crystal panel, and a driving mode of the blue liquid crystal panel are each a vertical alignment type.

8. The projection liquid crystal display device according to claim 1, wherein the red liquid crystal panel, the green liquid crystal panel, and the blue liquid crystal panel each modulate a transmitted light beam.

9. The projection liquid crystal display device according to claim 1, wherein the red liquid crystal panel, the green liquid crystal panel, and the blue liquid crystal panel are each in a dark display state when no voltage is applied.

10. An electronic apparatus, comprising:
a first optical system that splits a light beam outputted from a light source into a red light beam, a green light beam, and a blue light beam;
a red liquid crystal panel configured to modulate the red light beam;
a green liquid crystal panel configured to modulate the green light beam;
a blue liquid crystal panel configured to modulate the blue light beam;
a second optical system that combines the modulated red light beam, the modulated green light beam, and the modulated blue light beam into one optical path; and
a projection lens system that projects a light beam outputted from the second optical system on a projection surface, wherein
a driving voltage of the red liquid crystal panel, a driving voltage of the green liquid crystal panel, and a driving voltage of the blue liquid crystal panel are identical to each other,
a configuration of a liquid crystal layer of the red liquid crystal panel is different from a configuration of a liquid crystal layer of the green liquid crystal panel and a configuration of a liquid crystal layer of the blue liquid crystal panel,
the configuration of the liquid crystal layer of the green liquid crystal panel is identical to the configuration of the liquid crystal layer of the blue liquid crystal panel, and
the configuration corresponds to a cell gap of the liquid crystal layer.

* * * * *